Figure 2:
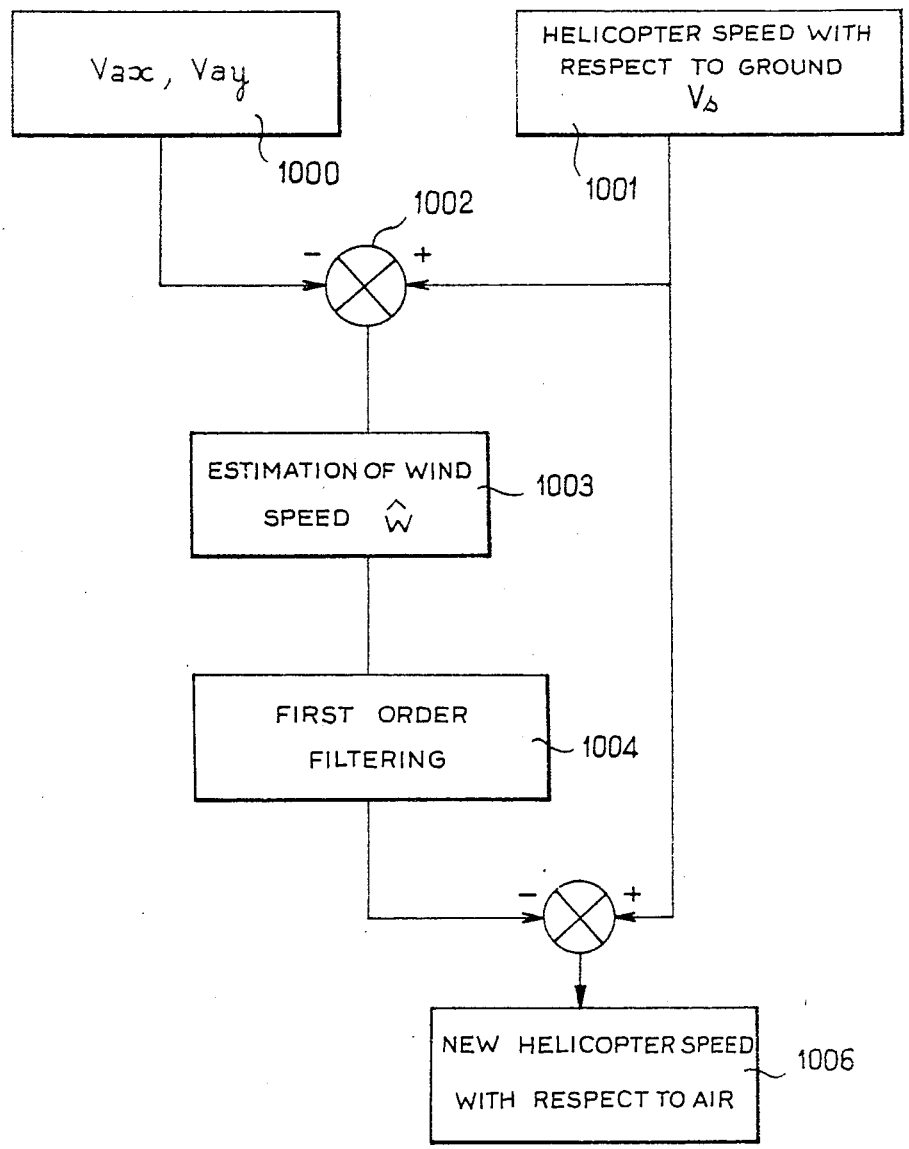

United States Patent [19]
Favre et al.

[11] Patent Number: 4,794,793
[45] Date of Patent: Jan. 3, 1989

[54] METHOD AND APPARATUS FOR MEASURING THE AIRSPEED OF A HELICOPTER AT LOW SPEED

[75] Inventors: Hélène Favre, Massy; Jean T. Audren, Orsay, both of France

[73] Assignee: Societe De Fabrication D'Instruments De Mesure, France

[21] Appl. No.: 150,544

[22] Filed: Feb. 1, 1988

[30] Foreign Application Priority Data

Feb. 4, 1987 [FR] France ................. 87 01367

[51] Int. Cl.$^4$ .............................................. G01C 21/10
[52] U.S. Cl. ................................. 73/178 H; 73/181; 364/443
[58] Field of Search ............. 73/181, 178 H; 364/443; 244/17.13

[56] References Cited

U.S. PATENT DOCUMENTS

| | | | |
|---|---|---|---|
| 4,023,409 | 5/1977 | Durand | 73/178 H |
| 4,648,269 | 3/1987 | Durand | 73/178 H |
| 4,702,106 | 10/1987 | Hassenpflug et al. | 73/178 H |

Primary Examiner—Donald O. Woodiel
Attorney, Agent, or Firm—McCormick, Paulding & Huber

[57] ABSTRACT

A helicopter is provided with a lift rotor (Ros), a tail rotor (Rac), first control means for the longitudinal (Pcx) and lateral (Pcy) cyclic pitch of the lift rotor and second control means for the pitch (Pac) of the tail rotor. The parameters such as the longitudinal cyclic pitch (Pax), the lateral cyclic pitch (Pcy), the longitudinal acceleration (Vx) and the acceleration of the helicopter (Vy) as well as the collective pitch (Pcol) of the lift rotor (Ros) and the pitch of the tail rotor (Rac) are measured. The longitudinal (Vax) and lateral (Vay) speed of the helicopter with respect to the air are determined from a biunivocal function of the measured values, particularly in linear combination.

14 Claims, 4 Drawing Sheets

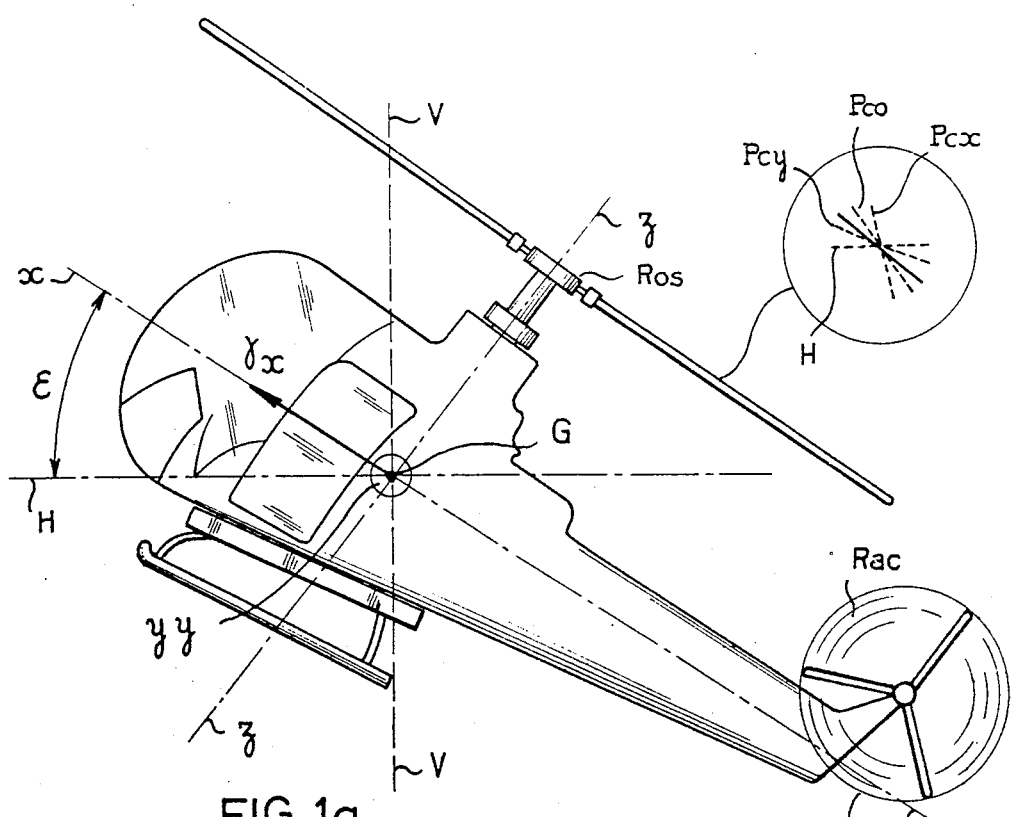
FIG_1a
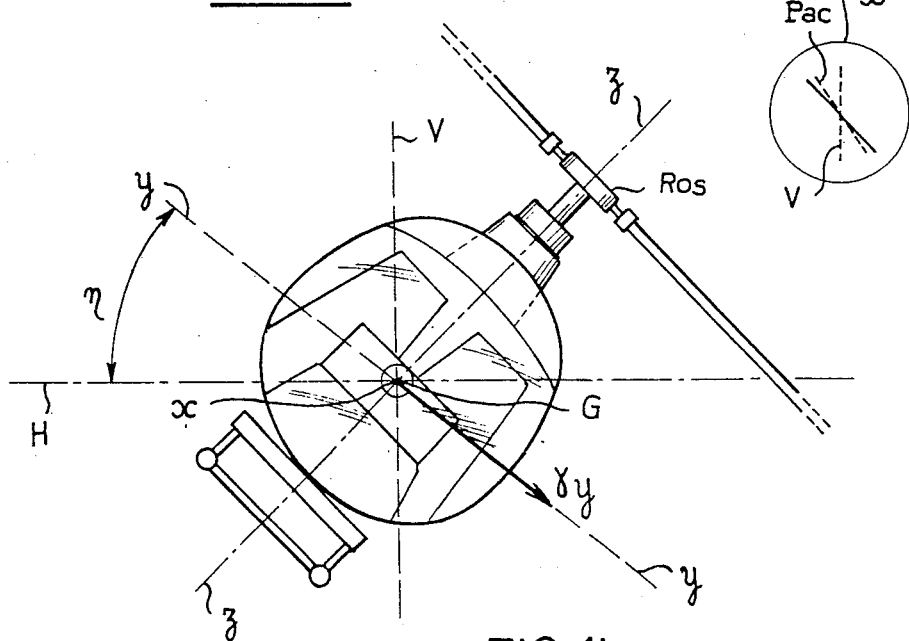
FIG_1b

METHOD AND APPARATUS FOR MEASURING THE AIRSPEED OF A HELICOPTER AT LOW SPEED

FIELD OF THE INVENTION

The present invention relates to a method and an apparatus for measurement of air speed of a helicopter at slow speed.

BACKGROUND OF THE INVENTION

Presently the apparatus used for measurement of air speed of a helicopter permits the obtaining of results giving a sufficient accuracy for average and high speeds, that is to say greater than 50 knots or substantially 25 m/s. These measuring apparatuses based on the principle of comparison of the dynamic pressure generated by displacement of the helicopter in the air and of the static pressure of this cannot pretend to permit establishment of the parameters of the vector speed of the helicopter, only the axial speed, in the longitudinal direction of the helicopter and in the front to rear direction of this being alone able to be determined. The replacement of these apparatuses by more complex apparatuses cannot be envisaged, these more complex apparatuses being reserved to fixed installations of test flight centres.

THE INVENTION

The present invention has the object of remedying the mentioned inconveniences by providing a method and apparatus for measurement of speed with respect to the air of a helicopter from the mechanic and dynamic operating parameters of the helicopter in flight.

Another object of the present invention is to provide a method and apparatus for measurement of speed with respect to the air of a helicopter permitting determination of the vector speed of the helicopter with respect to the air in a reference frame of longitudinal x and transverse y axes defining when the helicopter is on the ground, a plane parallel to the ground.

Another object of the present invention is also to provide a method and apparatus for measurement of the speed with respect to the air of a helicopter at low speed permitting the obtaining of values of speed measured with good precision, in order to increase safety in stationary flight, in the course of flights in civil security operations or military or police operations.

Another object of the present invention is finally to provide a method and apparatus for measurement of speed with respect to air of a helicopter at low speed permitting in the case of an application to an armed helicopter, improving the firing corrections of non-guided weapons carried by the helicopter.

The method of measuring speed with respect to the air of a helicopter at low speed according to the invention, particularly in the region of stationary flight, the helicopter comprising a lift rotor, a tail rotor, first control means of the cyclic pitch and of the collective pitch of the lift rotor and second control means for the pitch of the tail rotor, is remarkable in that the longitudinal x and transverse y directions defined by a reference frame of axes x,y connected to the centre of gravity of the helicopter and defining, the helicopter being on the ground, a plane parallel to the ground, this method consists of simultaneously measuring the longitudinal cyclic pitch of the blades of the lift rotor, the lateral cyclic pitch of the blades of the lift rotor, the longitudinal acceleration and the transverse acceleration of the helicopter, the collective pitch imposed on the blades of the lift rotor and the pitch imposed on the blades of the tail rotor. The longitudinal speed and the lateral speed of the helicopter with respect to the air are determined and established from a biunivocal function of the measured values of the longitudinal cyclic pitch, the lateral cyclic pitch, of the longitudinal acceleration, the lateral acceleration, the collective pitch and the tail rotor pitch respectively.

The apparatus for measuring the speed with respect to the air of a helicopter, particularly in the region of stationary flight, according to the method of the invention, is remarkable in that it comprises means for measurement of the longitudinal cyclic pitch of the blades of the lift rotor, means for measurement of the lateral cyclic pitch of the blades of the lift rotor, means for measurement of the longitudinal acceleration and of the lateral acceleration of the helicopter with respect to the ground, means for measurement of the collective pitch imposed on the blades of the lift rotor and of the pitch of the tail rotor. Means for calculation of the longitudinal speed and of the transverse speed of the helicopter with respect to the air permit the establishment of the value of these speeds from a biunivocal function of the measurement parameters of the longitudinal cyclic pitch, of the lateral cyclic pitch, of the collective pitch and of the tail rotor pitch.

The method and apparatus according to the invention find application in the civil and military aeronautic industry, for providing navigation systems for helicopters, in the armaments industry for providing helicopter-carried fire control systems.

THE DRAWINGS

Figure 3:
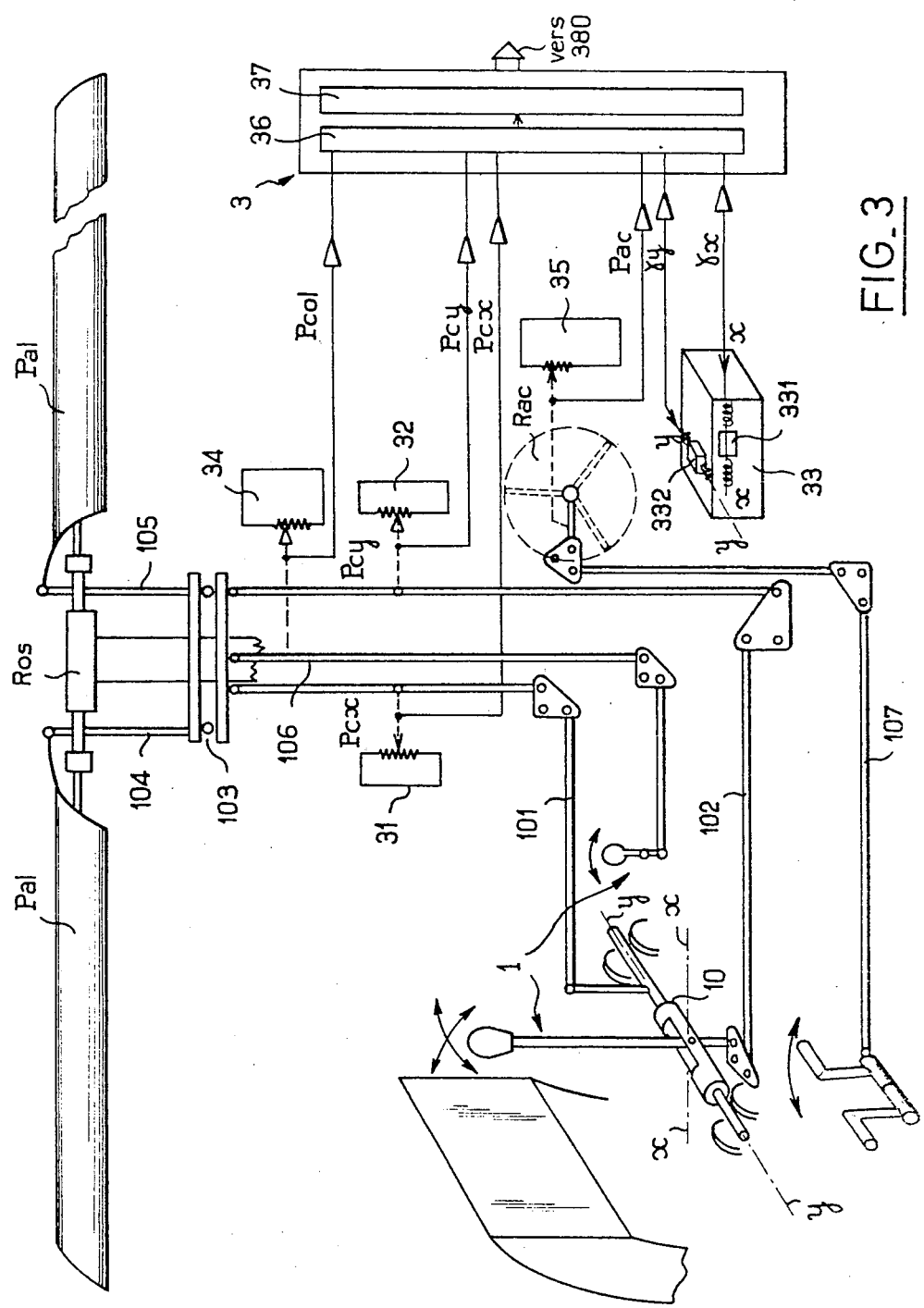
Figure 4:
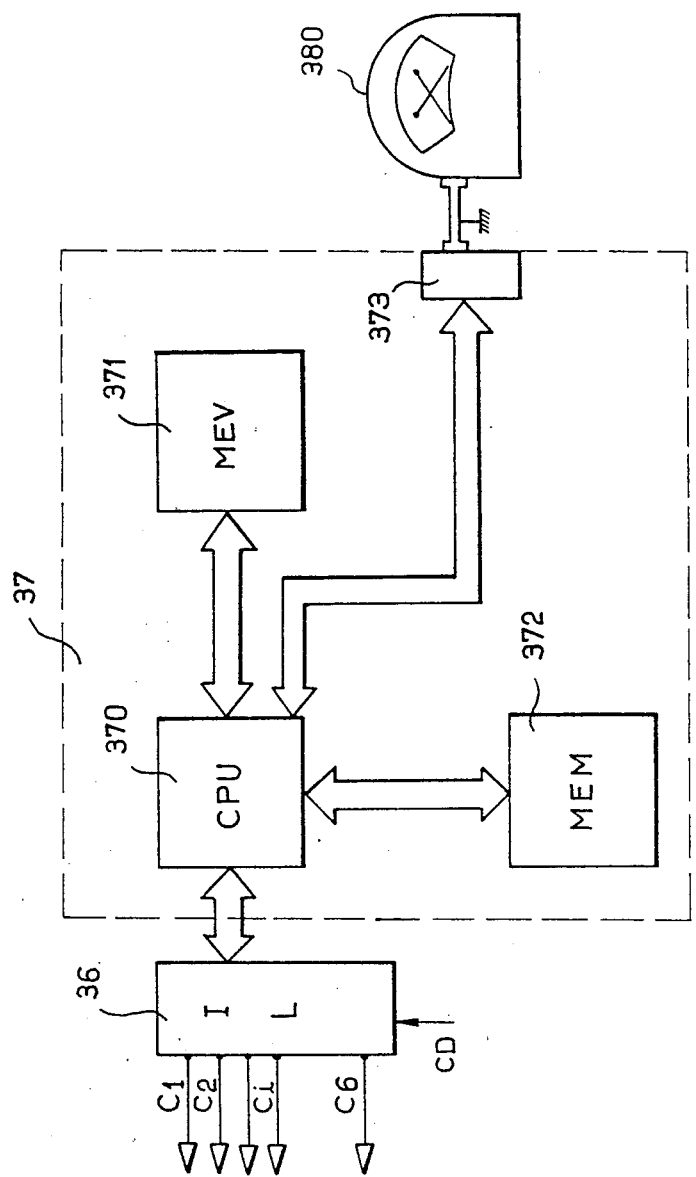

The method and the apparatus of the invention will be better understood from reading the description and studying the accompanying drawings, in which:

FIGS. 1a and 1b show a view of a helicopter in flight permitting illustration, in a schematic manner, of the method according to the invention, FIG. 2 shows in a non-limitative manner, a flow chart for filtering the component of speed due to the wind and, or calculating the values of longitudinal and transverse speed of the helicopter with respect to the air, according to a characteristic advantage of the method of the invention, FIG. 3 shows an illustrative diagram of apparatus for measurement of, helicopter air speed according to the method of the present invention, FIG. 4 shows a detail in accordance with a non-limitative variant of calculation means permitting the provision of the method of the present invention.

THE PREFERRED EMBODIMENT

The method of measuring the air speed of a helicopter in accordance with the invention will now be described in connection with FIGS. 1a and 1b, which permit definition, with the helicopter in flight, of the mechanic and/or dynamic parameters permitting the measurement of the speed of the helicopter with respect to the air, in accordance with the method of the invention.

The method of the invention is essentially applicable to any helicopter having a lift rotor designated Ros in the FIGS. 1a and 1b, a tail or anticouple rotor Rac, this rotor being in a manner known in itself intended to exert a restoring couple opposing the rotation of the body of the helicopter by reaction with respect to the rotational movement of the lift rotor Ros. In a known manner, the helicopter of which the air speed is able to measured in accordance with the method of the invention, comprises in a known manner, first control means for the cyclic pitch, designated in a general manner Pc and of the collective pitch designated Pcol of the blades of the lift rotor Ros. It will be recalled that the blades of the lift rotor Ros have with respect to a reference direction, the direction H in FIGS. 1a and 1b, a mean inclination called the inclination of collective pitch, which can of course be controlled by the pilot with the help of the first control means. To the collective pitch inclination of the blades of the lift rotor Ros, is superimposed an inclination called the cyclic pitch designated Pc. In FIGS. 1a and 1b, there is further shown respectively a system of reference axes having a longitudinal axis designated xx and a lateral or transverse axis designated yy. The axes xx and yy, by way of non-limitative example, intersect substantially at the centre of gravity G of the helicopter and define, the helicopter being on the ground, a plane parallel to the ground. The longitudinal x and transverse y directions of the helicopter in flight are defined by the axes xx and yy of this. The axis zz is orthogonal to the plane formed by the axes xx and yy previously mentioned at the centre of gravity G of the helicopter. Of course, any other system of axes defined by translation of a determined vector can be used in a non-limitative manner and without departing from the scope of the present invention.

From the previously defined axes, is resolved into a longitudinal cyclic pitch Pcx of the blades of the lift rotor Ros and a lateral cyclic pitch Pcy of the blades of the lift rotor Ros. The longitudinal cyclic pitch Pcx and the lateral cyclic pitch Pcy now appear as the inclination pitch of the blades applied respectively to these, when during the course of rotation a considered blade is aligned in the direction xx, respectively yy. The inclination of the cyclic pitch is thus periodically applied in superposition to the inclination of the collective pitch of the blades of the lift rotor as is well known as the operating principle of helicopters. In operation in flight conditions, the pilot modifies on the one hand the inclination of the collective pitch, in order to ensure the lift of the helicopter to a determined altitude, and on the other hand, the inclination of the cyclic pitch and particularly the inclination of the longitudinal cyclic pitch and the transverse cyclic pitch, in order to ensure the corresponding displacement in translation of the helicopter, either in forwards reverse, reverse forwards, or in lateral movement. The modification of the collective pitch and of the longitudinal and transverse cyclic pitch is carried out with the help of the previously mentioned first control means. These will be described in more detail below in the description.

In FIG. 1a, there has been shown relative to the blades of the lift rotor Ros, with respect to a reference direction such as the horizontal designated H, the inclination of the collective pitch Pcol and the inclination of the cyclic pitch designated respectively, longitudinal cyclic pitch Pcx and lateral cyclic pitch Pcy, these different inclinations being shown by dotted lines. The corresponding blade of the lift rotor Ros is shown in full lines and has an inclination intermediary with respect to the inclinations of the cyclic pitch and of the collective pitch previously mentioned. Further, the helicopter has second control means for the pitch Pac of the tail rotor, that is to say of the inclination of the blades of the this. In the same manner, in FIG. 1a, there is shown the anticouple pitch Pac by a dotted line with respect to a reference direction, the vertical designated V. The second control means also permit the pilot to adjust inclination of the anticouple pitch of the tail rotor.

In accordance with a particularly advantageous characteristic of the method of the invention, this consists, in order to measure the speed with respect to the air of the helicopter, of simultaneously measuring the longitudinal cyclic pitch Pcx of the blades of the lift rotor Ros, the lateral cyclic pitch Pcy of the blades of the same lift rotor Ros, the collective pitch Pcol of the lift rotor Ros and the pitch Pac imposed on the blades of the tail rotor Rac.

These parameters called mechanical, that is to say connected directly to the mechanical configuration of the essential motor elements of the helicopter being measured, the method of the invention consists also of measuring other parameters called dynamic parameters, such as the longitudinal acceleration $\gamma x$ of the helicopter and the transverse acceleration y of this. It will be noted, as shown in FIGS. 1a and 1b, that the longitudinal acceleration $\gamma x$ is in fact representative of the direction of the trim angle of the helicopter in movement, the trim angled designated $\epsilon$ in the plane xx-zz with respect to the horizontal designated H, then the acceleration $\gamma y$ is on the other hand representative of the trim angle $\eta$ designated of the helicopter in the plane zz-yy with respect to the same horizontal reference direction.

The longitudinal seed designated Vax and lateral speed designated Vay of the helicopter with respect to the air can then, in accordance with the method of the invention, be determined and established from a biunivocal function of the measured values of the longitudinal Pcx and lateral Pcy cyclic pitch, of the collective pitch (Pcol) and the anticoupled pitch Pac and of the longitudinal acceleration $\gamma x$ and of the lateral acceleration $\gamma y$.

According to a particularly advantageous aspect of the method of the invention, the biunivocal function permitting establishment of the longitudinal Vax and lateral Vay speeds of the helicopter with respect to the air is a linear combination of these measured values. It will be noted, as will be described below in the description, that a linear combination of the previously measured parameters permits obtaining a good precision of restitution of the components of longitudinal Vax and lateral Vay speed of the helicopter with respect to the air. However, and in a non-limitative manner, non linear corrective terms for the measured values of longitudinal Pcx and lateral Pcy cyclic pitch, of longitudinal $\gamma x$ and lateral $\gamma y$ acceleration, of collective pitch Pcol and of anticouple pitch Pac can be introduced provided that the biunivocal character of the mentioned function is preserved. The mentioned function can then consist of a polynomial function of the previously mentioned measured values.

According to a particularly advantageous aspect of the method of the invention, the linear combinations of the measurement parameters establishing the value of the longitudinal Vax, respectively lateral Vay speed of the helicopter with respect to the air, have the same form and respectively verify the equations:

$$Vax = \alpha 1\ Pcx + \alpha 2\ Pcy + \alpha 3 \gamma x + \alpha 4 \gamma y + \alpha 5\ Pcol + \alpha 6\ Pac + \alpha 7,$$

$$Vay = \beta1\ Pcx + \beta2\ Pcy + \beta3\gamma x + \beta4\gamma y + \beta5\ Pcol + \beta6\ Pac + \beta7.$$

In the mentioned equations, the coefficients $\alpha1, \alpha2, \alpha3, \alpha4, \alpha5, \alpha6, \alpha7$ and respectively $\beta1, \beta2, \beta3, \beta4, \beta5, \beta6, \beta7$ are coefficients being real numbers. Thus, and in a nonlimitative manner, the choice of one of the mentioned coefficients at the value 0, correspond in fact to the absence of measurement of the corresponding parameter, the absence of such a measurement not departing from the scope of the method of measurement of air speed of a helicopter according to the present invention.

According to the method of the invention, the identification of the coefficients $\alpha1, \alpha2, \alpha3, \alpha4, \alpha5, \alpha6, \alpha7$ and respectively $\beta1, \beta2, \beta3, \beta4, \beta5, \beta6, \beta7$ of mentioned linear combinations and shown by the preceding equations, can be made from successive trials, for example in the course of flight, for a particular type of helicopter. To this end, a set of reference measurement apparatus for the longitudinal speeds vax and lateral speeds vay is advantageously placed on the apparatus or helicopter undergoing trial as well as elements for measurement necessary to the measurement parameters operating for the calculation of the longitudinal speed Vax and lateral speed Vay with respect to the air of the helicopter considered.

By way of non-limitative example, the apparatus for measurement of speed with respect to the air vax and vay constituting the reference measurement, can be constituted by an apparatus designated under the trade name LORAS, made and sold by the PACER company, this apparatus normally available in commerce consisting in anemometric capsules driven by a motor installed at the top of the fixed part of the lift rotor. This type of apparatus normally available in commerce will not be described; it permits measurement of longitudinal vax and lateral vay reference speeds of the helicopter with respect to the air. Other measurement apparatus permitting the obtaining of values of longitudinal vax and lateral vay reference speeds can be used such as for example the system designated by the trade name LASSIE, marketed by the MARCONI company. In this case however, the LASSIE apparatus is installed in the flow of air from the lift rotor Ros an consequently below this. This type of apparatus permits particularly determination of the reference speeds of the helicopter with respect to the air, such as longitudinal speeds vax, lateral speeds vay and ascending speeds designated vaz. The two types of mentioned apparatus can suit in the same manner as well as of course any type of commercially available low speed anemometer, able to give the speed of the helicopter with respect to the air in size and direction.

In the course of a test flight of the considered helicopter equipped with the mentioned apparatus, one carries out at least seven longitudinal vax and lateral vay measurements of the value of reference speeds with respect to air at different speeds, as well as of course corresponding values to these speeds of the corresponding measurement parameters, the longitudinal cyclic pitch Pcx, the cyclic pitch Pcy, the longitudinal $\gamma x$ and lateral $\gamma y$ acceleration, the collective pitch Pcol and the anticouple pitch Pac for the different reference speeds vax and vay.

Of course, the resolution of the linear system can then be carried out by the known methods of calculation for determining the corresponding coefficients $\alpha1, \alpha2, \alpha3, \alpha4, \alpha5, \alpha6, \alpha7$, respectively $\beta1, \beta2, \beta3, \beta4, \beta5, \beta6, \beta7$.

Of course, and in a non-limitative manner, it is advantageous to provide a number of measurements of the values of reference speed vax and vay, as well as their corresponding calculation parameter, in a number greater than 7, the system of linear combinations being then redundant. In this case, the resolution of the system can advantageously be provided by the method of least squares for example. This method of resolution of linear systems is well known to the man skilled in the art and will not be described in detail.

The linear combinations previously mentioned having been determined as described, for the apparatus of the type concerned, these can then of course in an advantageous manner be utilised for measuring the longitudinal Vax, respectively lateral Vay speed of the helicopter in the absence of the measurement apparatus used for the determination of these coefficients.

In the course of tests, in order to ensure the identification of the coefficients of linear combinations or the polynomial functions mentioned, it can be stated that the restitution of the value of the longitudinal Vax, respectively lateral Vay speed, for a given type of helicopter was substantially improved when the values of longitudinal Vax respectively lateral Vay speed were rendered substantially independent of the corresponding crossed parameters cyclic Pcy, respectively Pcx pitch and acceleration $\gamma y$, respectively $\gamma x$. In this case, the coefficients $\alpha2, \alpha4$ and $\beta1, \beta3$ are a minimum in the preceding equations 1 and 2. They have a value for a given type of helicopter 2 m and 4 m and respectively 1 m, 3 m. In this case, the values of speed called longitudinal and lateral of the helicopter with respect to the air Vax and respectively Vay, are established with respect to the axes X,Y oriented substantially at 45° with respect to the previously defined axes x,y, longitudinal axis xx and lateral axis yy, of the helicopter. This axis rotation has the effect of providing that the influence on the corresponding values of speed of the orthogonal components of the lateral cyclic pitch Pcy, respectively longitudinal Pcx, as well as of the transverse $\gamma y$ and longitudinal $\gamma x$ acceleration is minimised.

Different tests for a given type of equipment, for example a combat helicopter sold by the French Aerospatiale company under the name PUMA, have shown that in the case where biunivocal polynomial functions have reduced to these linear combinations, the best restitution of longitudinal Vax and lateral Vay speeds was obtained for a number of coefficients of linear combinations equal to 7, the coefficients $\alpha1, \alpha2, \alpha3, \alpha4, \alpha5, \alpha6, \alpha7$ respectively $\beta1, \beta2, \beta3, \beta4, \beta5, \beta6, \beta7$. In this case, the residual units of speed in the value of longitudinal speed Vax reached 1.30 knots, then the residual speed in the lateral speeds Vay reached 1.68 knots, or respective units less than about 1 m/s. In the case of use of linear combinations, the number of coefficients $\alpha, \beta$ taken equal to 7 then permits obtaining an optimum restitution of longitudinal Vax, respectively lateral Vay speed.

Variant

An advantageous variant of the method of measuring relative speed of a helicopter with respect to air, in accordance with the invention, will now be described in connection with FIG. 2.

In accordance with the mentioned Figure, following a stage designated 1000 of establishment of values of longitudinal Vax, lateral Vay speed, as previously described, other stages can be carried out.

These stages as shown in FIG. 2, can consist of an estimation of the approach speed of the wind designated $\hat{W}$ at 1003, from a speed reference of the helicopter with respect to the ground, speed designated Vs, the estimation of the wind approach speed $\hat{W}$ being carried out by subtraction at 1002 of the speed with respect to the ground Vs of the speed of the helicopter with respect to the air, from the longitudinal Vax and lateral Vay components of these. The estimated wind speed W is then submitted to filtering at 1004 by means of a first order numeric filter, permitting freeing the result from transitory phenomena due to the helicopter, such as for example an untimely disturbance in the course of an untimely manoeuvre of this by the pilot, measurement noise from the transducers for the values of the parameters for calculation of the longitudinal Vax and lateral Vay speed of the helicopter with respect to the air. A new calculation of the value of the longitudinal Vax and lateral Vay speeds of the helicopter with respect to the air is carried out by a subtraction at 1006 of the speed estimated for the wind $\hat{W}$ after filtering and of the reference speed of the speed Vs with respect to the ground.

A more detailed description of apparatus for measurement of the speed with respect to the air of a helicopter, in accordance with the previously described method of the invention, will now be given in connection with FIG. 3.

In FIG. 3, there is shown the essential members of a helicopter comprising a lift rotor designated Ros, a tail rotor designated Rac, first control means for the cyclic pitch Pc and for the collective pitch Pcol, for the blades of the lift rotor Ros. It will be noted that, in a known manner, the first control means designated 1 for the cyclic pitch Pc and for the collective pitch Pcol of the blades of the lift rotor Ros, comprise a sleeve, of the joy stick sleeve type, driving via a mechanism 10 conferring to the mentioned sleeve two degrees of freedom in the longitudinal direction xx and in the transverse or lateral direction yy, a double set of linkages 101 and 102, controlling the longitudinal cyclic pitch Pcx and the transverse cyclic pitch Pcy, respectively of the blades Pal of the lift rotor, via the intermediary of =coupling system and of intermediary links 104,105. The collective pitch Pcol is directly controlled via the set of linkages 106 and the coupling system 103 and of intermediary linkages 104 and 105 or by any equivalent mechanical means. These mechanical elements will not be described further in detail because they form part of the known technique of control of driving and orientation of blades of a helicopter.

Similarly, the helicopter as shown in FIG. 3 in its essential elements, comprises two means designated 2 for control of the pitch designated Pac of the tail rotor Rcc.

As shown in FIG. 3, and in a particularly advantageous manner, the device according to the invention comprises means designated 3, 31 for measuring the longitudinal cyclic pitch Pcx of the blades of the lift rotor Ros, these means delivering a measurement signal of the longitudinal cyclic pitch Pcx. The apparatus according to the invention also comprises means designated 3, 32 for measurement of the lateral cyclic pitch Pcy of the blades of the lift rotor Ros. These means deliver a measurement signal for the lateral cyclic pitch Pcy.

Further, as is also shown in FIG. 3, means designated 3, 33 are provided, in order to ensure the measurement of the longitudinal acceleration $\gamma x$ of the helicopter with respect of the ground, and the lateral acceleration $\gamma y$ of the helicopter with respect to the ground, these means 3, 33 delivering a measurement signal for longitudinal acceleration $\gamma x$ and for lateral acceleration $\gamma y$ of the helicopter with respect to the ground. By longitudinal acceleration $\gamma x$ and lateral acceleration $\gamma y$ of the helicopter with respect to the ground, is intended in fact the total acceleration of the helicopter in the direction of the axes xx and yy previously defined, taking account of the component of gravity acting on the measurement means 33. Similarly, the measurement means 34 of the collective pitch Pcol imposed on the blades of the lift rotor Ros permit deliverance of a measurement signal of the collective pitch Pcol. In the same way, the measurement of the pitch Pac of the tail rotor Rac is assured by means 35 for measurement of the mentioned pitch, these means delivering a measurement signal of the pitch Pac of the tail rotor Rac.

The assembly of the measurement means 31 for the longitudinal cyclic pitch Pcx, for the transverse or lateral cyclic pitch Pcy 32, for the longitudinal acceleration $\gamma x$ and the transverse or lateral acceleration $\gamma y$ 33, for the collective pitch, means 34, and for the anticouple pitch Pac 35, is connected to an electronic assembly 3 via appropriate connections. The mentioned electronic assembly, comprises in an advantageous manner, an interface circuit 36, which will be described in more detail in connection with FIG. 4, and calculation means 37, for the longitudinal speed Vax and the transverse speed Vay of the helicopter with respect to the air, these speeds being expressed from, as previously described in connection with the method of the invention, a biunivocal function of the measurement parameters for the longitudinal cyclic pitch Pcx, for the lateral cyclic pitch Pcy, for the longitudinal acceleration $\gamma x$, for the lateral acceleration $\gamma y$, for the collective pitch Pcol and for the pitch Pac of the tail rotor Rac.

According to an advantageous characteristic of the apparatus according to the invention, the means 31,32 for measurement of the longitudinal cyclic pitch Pcx and of the lateral cyclic pitch Pcy comprise displacement transducers for the cyclic control means 101,102 for the pitch of the lift rotor. As shown schematically in FIG. 3, these displacement transducers can advantageously be constituted by position copying potentiometers of which the movable connection contact is fixed to the linkage 101, respectively 102, for control of the orientation of the blades of the lift rotor.

In a similar manner, the means 34, 35 for measurement of the collective pitch Pcol o the lift rotor Ros of the pitch Pac of the tail rotor Roc, comprise displacement transducers for the control means for the collective pitch of the blades of the lift rotor and of the tail rotor. The displacement transducers are also constituted by position copying potentiometers, of which the movable contact is connected to the control linkage of the corresponding rotors.

As is further shown in FIG. 3, the means 33 for measuring the longitudinal acceleration $\gamma x$ and transverse acceleration $\gamma y$ advantageously comprise movable mass accelerometers, shown schematically on FIG. 3 by the masses 331 and 332. As has already been mentioned, these accelerometers deliver a signal representative of the total acceleration of the helicopter along the directions xx and yy, taking account of the influence of gravity.

A more detailed description of the calculation means 3 will now be given in connection with FIG. 4.

In accordance with the mentioned FIG. 4 and particularly when the biunivocal function permitting the calculation of longitudinal Vax and lateral Vay speeds is a linear combination of the measured values, these means preferably comprise means for sampling 36 and digitisation of the measurement signals for the longitudinal cyclic pitch Pcx and of the lateral cyclic pitch Pcy of the longitudinal acceleration γx, and of the lateral acceleration γy, of the collective pitch Pcol and of the pitch Pac of the tail rotor. These sampling means 36 can advantageously be constituted by a rapid analog-digital conversion table, playing the role of interface between the connection routes designated C1, C2, Ci, C6 on FIG. 4 for each of the measuring means, and the calculation means as such designated 37 in FIG. 3 and in FIG. 4.

The calculation means 37 can advantageously be constituted by a calculator of an inertial system connected for helicopters, known by the term "strapdown". This type of station is sold by the applicant under the reference 28 SH.

The calculation means as such 37 can also be constituted by an auxiliary calculator, which will be described below in the description.

As can be noted, the sampling and digitisation means for the measurement signals comprise an input designated CD, which constitutes an input able to receive information of ground speed delivered by a Doppler radar on board the helicopter. This is in order to permit the provision of filtering of the estimated wind speed as described pre viously in relation to the method of the invention.

The calculation means as such can also comprise, as shown in FIG. 4, when these calculation means are constituted by an auxiliary calculator as shown in the mentioned figure, a central calculating unit designated CPU, also designated 370, and memory means. The central calculating unit can advantageously be constituted by a microprocessor sold under the reference 8080 by the INTEL company. Further, the calculation means 37 include memory means 371 of the active memory type, intended to memorise the instantaneous value of the digitised measurement values. The active memory 371 designated Mv in FIG. 4, preferably has a memory capacity of 0.5 KOctet. Further, memory means 372 of the passive memory type are provided, the active memory 371 and the passive memory 372 being connected to the central unit by a conventional BUS type connection.

According to an advantageous characteristic of the apparatus according to the invention, the means 372 of the passive memory type designated MEM comprise for a given type of helicopter, a value table for coefficients $\alpha1,\alpha2,\alpha3,\alpha4, \alpha5,\alpha6,\alpha7$ and $\beta1,\beta2,\beta3,\beta4,\beta5,\beta6,\beta7$, permitting the establishment of biunivocal functions or linear combinations expressing the longitudinal Vax and lateral Vay speeds, as a function of functional parameters of the helicopter. The mentioned tables of values can be constituted by tables of multiple values corresponding to the useful load of the helicopter, to centering of the load of this and to the position at its centre of gravity for example and can be selected as a function of the corresponding use of the helicopter.

Of course, the means for calculation also comprise a calculation program for values of linear combinations or biunivocal functions expressing the longitudinal Vax and transverse Vay speed of the helicopter with respect to the air.

Further, the calculation means also comprise a calculation program for changing the axis by rotation substantially equal to 45°, as previously described in connection with the method of the invention.

Also as has been shown in FIG. 4, the device comprises means for displaying the instantaneous values of longitudinal Vax and lateral Vay speeds. These means can be constituted for example as shown in FIG. 4, by an indicator of stationary speed referenced 380.

There has thus been described a method and apparatus for measurement of the speed of a helicopter with respect to the air which has a particularly good performance. The method and apparatus according to the invention in fact permit the measurement of components of speed with respect to the air of the helicopter, the longitudinal and lateral components with a precision better than 1 m/s.

We claim:

1. A method of measuring the speed with respect to the air of a helicopter, particularly in the region of stationary flight, said helicopter comprising a lift rotor, a tail rotor, first control means for the cyclic pitch and for the collective pitch of said lift rotor and second control means for the pitch of said tail rotor, wherein longitudinal x and transverse y directions are defined by a reference frame of axes x,y connected to the centre of gravity of said helicopter and defining, with said helicopter on the ground, a plane parallel to the ground, said method consisting of simultaneously:
    measuring longitudinal cyclic pitch (Pcx) of blades of said lift rotor,
    measuring lateral cyclic pitch (Pcy) of said blades of said lift rotor,
    measuring longitudinal acceleration (γx) of said helicopter,
    measuring lateral acceleration (γy) of said helicopter,
    measuring collective pitch (Pcol) imposed on said blades of said lift rotor,
    measuring pitch (Pac) imposed on the blades of said tail rotor,
    determining and establishing longitudinal (Vax) and lateral (Vay) speed of said helicopter with respect to the air, from a biunivocal function of said measured values of said longitudinal (Pcx) and lateral (Pcy) cyclic pitch, said longitudinal (γx) and lateral (γy) acceleration, said collective pitch (Pcol) and said pitch of said tail rotor (Pac) respectively.

2. A method according to claim 1, wherein said biunivocal function permitting establishment of said longitudinal (Vax) and lateral (Vay) speeds of said helicopter with respect to the air is a linear combination of said measured values.

3. A method according to claim 2, wherein said linear combinations of said measurement parameters establishing said value of said longitudinal (Vax) and lateral (Vay) speed respectively of said helicopter with respect to the air are the same and verify respectively equations:
Vax $$Vax = \alpha1\ Pcx + \alpha2\ Pcy + \alpha3\gamma x + \alpha4\gamma y + \alpha5\ Pcol + \alpha6\ Pac + \alpha7,$$

$Vay = \beta1\ Pcx + \beta2\ Pcy + \beta3\gamma x + \beta4\gamma y + \beta5\ Pcol + \beta6\ Pac + \beta7,$ wherein coefficients $\alpha1, \ldots \alpha7$ and $\beta1 \ldots \beta7$ are real numbers.

4. A method according to claim 3, wherein identification of said coefficients $\alpha1, \alpha2 \ldots \alpha7$ and $\beta1, \beta2, \ldots \beta7$ is carried out from successive tests by a least squares method.

5. A method according to claim 3, wherein in order to express said values of longitudinal (Vax) and lateral (Vay) speeds respectively, substantially independent of crossed parameters of cyclic pitch (Pcy), (Pcx) respectively and of acceleration ($\alpha y$), ($\alpha x$), respectively, said coefficients $\alpha2, \alpha4$ and $\beta1, \beta3$ thus being a minimum, and having the value $\alpha2\ m\alpha4\ m$ and $\beta1\ m\beta3\ m$ respectively, said values of longitudinal (VAX) and lateral (VAY) speed of said helicopter with respect to the air are established with respect to axes X, Y oriented substantially at 45° with respect to said axes x,y, the longitudinal axis and lateral axis of said helicopter, the influence on said corresponding values of said speed of orthogonal components of said cyclic pitch (Pcy) respectively (Pcx) and of said longitudinal ($\Delta x$) and transverse ($\gamma y$) accelerations being minimised.

6. A method according to claim 3, wherein following establishment of said values of said longitudinal (Vax) and lateral (Vay) speed, there are carried out:
- an estimation of wind speed ($\hat{W}$) from a reference of speed of said helicopter with respect to the ground, by substraction,
- filtering of said estimated wind speed ($\hat{W}$) by means of a first order numeric filter freeing calculation of said longitudinal (Vax) and lateral (Vay) speed of said helicopter with respect to the air from transitory phenomena due to said helicopter,
- a new calculation of said value of longitudinal (Vax) and lateral (Vay) speeds of said helicopter with respect to the air, by subtraction of said estimated wind speed ($\hat{W}$) after filtering and of said reference speed with respect to the ground.

7. Apparatus for measuring speed with respect to the air of a helicopter, particularly in the region of stationary flight, said helicopter comprising a lift rotor, a tail rotor, first control means for cyclic pitch (Pc) and for collective pitch (Pcol) of said lift rotor and second control means of pitch (Pac) of said tail rotor, said device comprising:
- means for measurement of longitudinal cyclic pitch (Pcx) of blades of said lift rotor, and delivering a measurement signal of said longitudinal cyclic pitch (Pcx),
- means for measuring lateral cyclic pitch (Pcy) of said blades of said lift rotor and delivering a measurement signal of said lateral cyclic pitch (Pcy),
- means for measurement of longitudinal ($\gamma x$) and lateral ($\gamma y$) acceleration of said helicopter with respect to the ground and delivering a measurement signal of said longitudinal acceleration ($\gamma x$) and a measurement signal of said lateral acceleration ($\gamma y$) respectively,
- means for measurement of said collective pitch (Pcol) imposed on said blades of said lift rotor and delivering a measurement signal of said collective pitch (Pcol),
- means for measurement of said pitch (Pac) of said tail rotor and delivering a measurement signal of said pitch (Pac) of said tail rotor,
- means for calculation of longitudinal (Vax) and transverse (Vay) speed of said helicopter with respect to the air, said speeds (Vax, Vay) being expressed from a biunivocal function of measurement parameters of said longitudinal cyclic pitch (Pcx), of said lateral cyclic pitch (Pcy), of said longitudinal acceleration ($\gamma x$), of said lateral acceleration ($\gamma y$), of said collective pitch (Pcol) and of said pitch (Pac) of said tail rotor.

8. Apparatus according to claim 7, wherein said means for measurement of said longitudinal cyclic pitch (Pcx) and of said lateral cyclic pitch (Pcy) comprise displacement transducers for said means for cyclic control of pitch of said lift rotor.

9. Apparatus according to claim 8, wherein said means for measurement of said collective pitch (Pcol) of said lift rotor and of said pitch (Pac) of said tail rotor comprise displacement transducers for said control means of collective pitch of said blades of said lift and tail rotors.

10. Apparatus according to claim 8, wherein said means for measurement of said longitudinal acceleration ($\gamma x$) and of said transverse acceleration ($\gamma y$) comprise movable mass accelerometers.

11. Apparatus according to claim 7, wherein said biunivocal function being a linear combination of said measured values, said calculation means comprise:
- means for sampling and digitisation of said measurement signals of said longitudinal cyclic pitch (Pcx), of said lateral cyclic pitch (Pcy), of said longitudinal acceleration ($\gamma x$), of said lateral acceleration ($\gamma y$), of said collective pitch (Pcol) and of said pitch (Pac) of said tail rotor,
- memorisation means of the active memory type intended to memorise the instantaneous value of said digitised measurement values,
- memorisation means of said passive memory type comprising, for a helicopter of given type, a table of values of coefficients $\alpha1, \ldots \alpha7, \beta1 \ldots \beta7$ permitting establishment of linear combinations expressing said longitudinal (Vax) and lateral (Vay) speeds as a function of operating parameters.

12. Apparatus according to claim 11, wherein said calculation means further comprise a calculation program for values of linear combinations expressing said longitudinal (Vax) and transverse (Vay) speed.

13. Apparatus according to claim 11, wherein said calculation means further comprise a calculation program for changing axis by rotation of substantially 45°.

14. Apparatus according to claim 7, wherein further comprising means for displaying instantaneous values of said longitudinal (Vax) and lateral (Vay) speeds.

* * * * *